INVENTOR.
FREDERICK H. ZIMMERLI

BY Arthur H. Swanson

ATTORNEY.

*INVENTOR.*
FREDERICK H. ZIMMERLI
BY Arthur H. Swanson
ATTORNEY.

Dec. 1, 1959   F. H. ZIMMERLI   2,915,695
ELECTRIC SIGNAL TRANSDUCER
Filed May 29, 1953   3 Sheets-Sheet 3

*INVENTOR.*
FREDERICK H. ZIMMERLI
BY
*Arthur H. Swanson*
ATTORNEY.

United States Patent Office 2,915,695
Patented Dec. 1, 1959

2,915,695

ELECTRIC SIGNAL TRANSDUCER

Frederick H. Zimmerli, Fort Washington, Pa., assignor to Minneapolis-Honeywell Regulator Company, Minneapolis, Minn., a corporation of Delaware Application May 29, 1953, Serial No. 358,225

13 Claims. (Cl. 323—66)

A general object of the present invention is to provide a new and improved apparatus for changing an input signal into an output signal in a changed energy form. More specifically, the apparatus is concerned with converting a voltage signal into a pressure or an electric current signal which converted signal will accurately and linearly follow the input voltage signal.

In the field of electrical controllers, it is frequently necessary to provide control devices which will respond to relatively small input voltage signals and which will produce output control signals of sufficient magnitude that they may be used directly for controlling purposes. While the output from the controller may be in the form of either a pneumatic or electric current signal, the particular output selected will be dependent upon the control problem at hand. The output control signal will generally be in the form of a pneumatic pressure when the transmission distance is not great and where considerable power handling capacity is required for operating a pneumatic valve or some other such device. An electric current signal will generally be used as an output control signal when the control signal is to be transmitted over a considerable distance. As is well known, the electric current signal will not possess the delays inherent in a pneumatic system.

The degree of accuracy attained with these controllers is dependent upon the manner in which the input control signal is transformed into an output control signal. In other words, it is essential that the output of the controller follow accurately the input with the apparatus preferably arranged so that the output does not in any way load or affect the input. As the controller must operate in a linear manner, the linearizing of the control is accomplished by incorporating a feedback from the output to the input in order to stabilize as well as linearize the controller. As the output signal from the apparatus is in a changed energy form, it is essential that the output signal be reconverted into the input signal form for signal balancing purposes. This puts an additional burden on the apparatus in that the feedback signal must also be linear if the controller output is to linearly follow the input signals.

An additional problem comes into play when the apparatus is used with such devices as thermocouples wherein cold junction compensation must be taken into account in an accurate control. In addition, it is frequently desired to suppress the operating range of the controller. Prior art devices have employed cold junction compensation on the input to the controller with an accompanying loss of sensitivity as well as the accompanying difficulty of accurately adjusting these prior art devices which of necessity must be extremely delicate if they are not to interfere with the input.

It is therefore a further object of the present invention to provide an improved apparatus for changing an input energy form into a second energy form where the second energy form is converted into the first energy form for stabilizing and linearizing purposes.

A still further object of the present invention is to provide an improved signal transducing apparatus wherein an output signal is fed back to the input of the apparatus and a further feedback is superimposed on the first-mentioned feedback.

Another object of the present invention is to provide a new and improved signal transducing apparatus employing a transducer having a first feedback with a further feedback on the first-mentioned feedback and wherein compensating adjustments for the transducer are accomplished in the feedback of the apparatus.

Still another object of the present invention is to provide a new and improved apparatus for converting an electrical voltage signal into a proportional pneumatic pressure wherein the pneumatic pressure produces a feedback signal to balance the electric voltage input.

A still further object of the present invention is to provide a new and improved apparatus for converting an electric voltage signal into an electric current of proportional magnitude wherein the electric current is fed back through suitable transducing means to balance the input voltage signal and wherein suitable resilient compensating means are incorporated in the last-mentioned transducing means.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Figure 1:
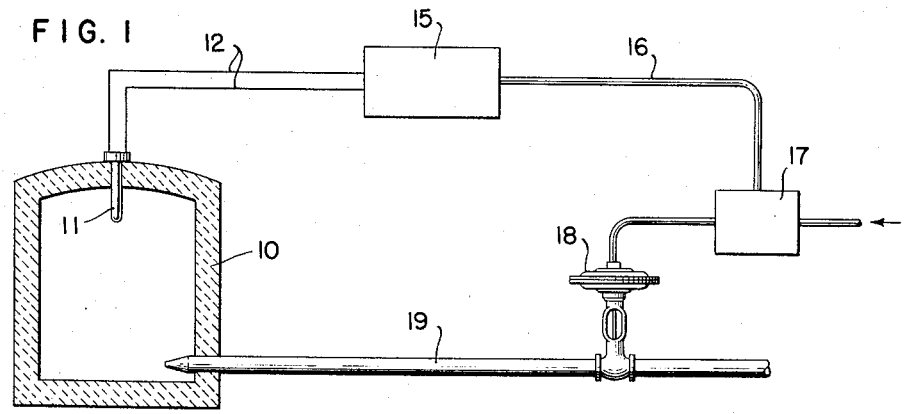
Fig. 1 is a diagrammatic showing of the manner in which the present apparatus may be incorporated in a control system.

Referring to Fig. 1, the numeral 10 represents a furnace whose temperature is being controlled. A thermocouple or other similar temperature sensing element 11 is positioned within the furnace and the output leads 12 connect the thermocouple 11 to a suitable signal transducing apparatus 15. The output of the apparatus 15 may be in the form of a pneumatic pressure which is passed by conduit 16 to a suitable pneumatic relay 17 which in turn controls a supply of air to a pneumatic valve 18. The valve 18 regulates the flow of a combustible mixture in a conduit 19 which conducts the mixture to the furnace 10 to act as a source of heat for the furnace.

It will be obvious from the showing of Fig. 1 that the thermocouple 11, acting through the signal transducing apparatus 15, will establish an output control pressure which will regulate the valve 18 to control the fuel flow and thereby the temperature in the furnace 10.

Figure 2:
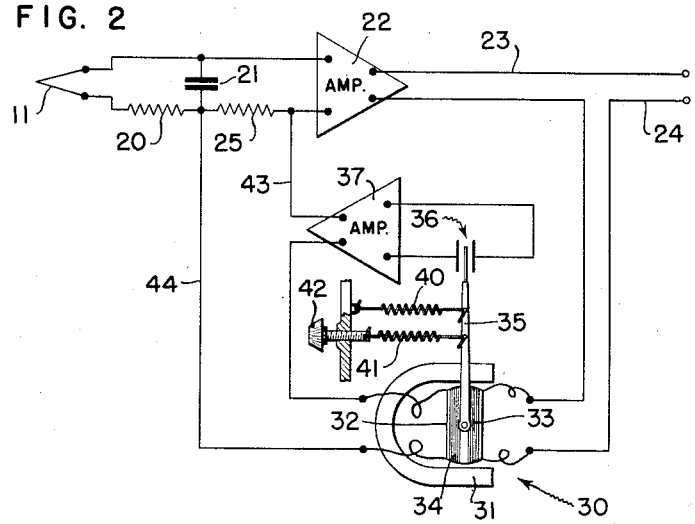
Fig. 2 shows one form of the apparatus which is arranged for converting a voltage signal into a current signal.

The apparatus shown in Fig. 2 shows one form that the signal transducing apparatus 15 may assume where there is an input electrical signal from the thermocouple 11 and there is an output electrical current on the leads 23 and 24 which may be used to actuate a suitable electric to pneumatic transducer of the type which will be explained in connection with Fig. 5. In the apparatus of Fig. 2, the thermocouple 11 is connected by way of a filter resistor 20 and condenser 21 to the input of a suitable amplifier 22. The amplifier will produce an output current on the output leads 23 and 24 which output current is effective through a feedback apparatus, to be hereinafter described, to establish a voltage across a balancing resistor 25 on the input of the amplifier 22.

The feedback apparatus around the amplifier 22 includes a galvanometer apparatus 30 which has a permanent magnet 31 and a galvanometer coil form 32 upon which is wound a pair of coils 33 and 34. While a coil form is shown, it is possible that the galvanometer coil can be self-supporting if constructed in a well known manner. The galvanometer coil form is effective, when displaced, to move an arm 35 which extends laterally therefrom and carries a plate of a motion detecting condenser 36. The motion detecting condenser 36 is on the input of an amplifier 37 which produces an output current proportional to the movement of the movable plate of condenser 36. This output current provides a feedback to the input of the amplifier 22 as well as a stabilizing feedback to galvanometer coil 34.

As the apparatus incorporates a thermocouple 11 it is necessary to provide some cold junction compensation for this thermocouple. This compensation is provided in the present apparatus by a cold junction compensating spring 40 which is arranged to apply a variable biasing force to the arm 35 carried by the galvanometer coil 32. Ambient temperature effects may also be compensated for by this spring 40. In addition, it is frequently desirable to suppress the operating range of the apparatus and for this purpose a suppression spring 41 is provided. This suppression spring 41 acts between a manually adjustable element 42 and the output element 35 of the galvanometer 30 and applies a force in accordance with the desired suppression, as established by the adjustment of the element 42.

The operation of the apparatus of Fig. 2 may be explained as follows. The thermocouple 11 will establish on the input of the amplifier 22 a control signal whose magnitude will be dependent upon the temperature condition of the thermocouple 11. The output of the amplifier appears upon the leads 23 and 24 in the form of an electric current and this electric current flows through the coil 33 of the galvanometer 30 and thence to a suitable current utilization device. The current flowing through the coil 33 will cause the coil to deflect the arm 35 to displace the movable plate of the condenser 36. This displacement will provide an input signal for the amplifier 37 which will have an output current proportional to the displacement of the movable electrode of the condenser 36. This output current will flow through the coil 34, conductor 44, resistor 25, and conductor 43 to establish a voltage across the resistor 25 to balance the input signal from the thermocouple 11 as well as a further feedback current for the galvanometer 30. The latter current feedback effectively force balances the movable arm 35 back toward its original position.

The apparatus is now in a balanced state with the input thermocouple voltage balanced by a voltage across the resistor 25. Should there be a change in the thermocouple voltage, the amplifier 22 will produce a changed output current which will change the force acting on the galvanometer 30. The change in the force on the galvanometer coil 33 of the galvanometer 30 will result in a change in the positioning of the arm 35 with a resultant change in the output of amplifier 37. The current change in the amplifier 37 will change the force balancing action of the coil 34 as well as the counterbalancing voltage across the resistor 25.

The cold junction compensating spring 40 provides the means for creating a force on the arm 35 proportional to ambient temperature changes. This changing force resulting from ambient temperature changes is in a direction to compensate for the resultant voltage changes of the cold junction of the thermocouple 11. In other words, the apparent voltage output of the thermocouple 11 will decrease with an increase in ambient temperature if the measured temperature is above the ambient temperature. The spring 40 will apply to the arm 35 a force which will require a greater amount of balancing current upon the coil 33 than would ordinarily result from that particular input signal magnitude. As the spring 40 is in the feedback loop, its size may be considerably larger than if the compensation were accomplished in the input of the amplifier 22. In other words, the spring 40 may well be in the form of a bimetal which has certain practical limitations as far as size is concerned when the manufacturing problem is considered. Thus, a fairly rugged compensating spring may be employed in this feedback loop without affecting in any way the sensitivity of the input of amplifier 22. Likewise, the suppression spring 41 may be relatively rugged in its form in that it may also be inserted in the feedback loop which permits relatively large elements which are readily adjusted without difficulty and danger of damage to the spring.

It will be noted from the apparatus of Fig. 2 that the input electrical signal is effectively isolated from the output so that regardless of what the loading is on the output leads 23 and 24 there is no resultant loading of the input which would tend to destroy the sensitivity of the apparatus.

Figure 3:
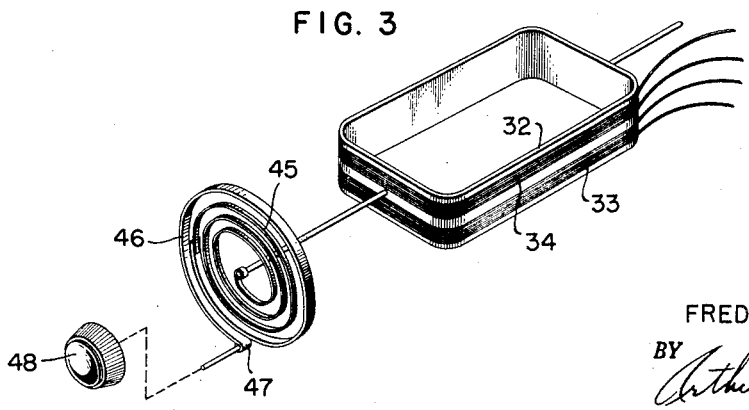
Fig. 3 shows a modified portion of the apparatus shown in Fig. 2.

While the apparatus of Fig. 2 has shown two separate compensating springs 40 and 41, the apparatus may be modified as shown in Fig. 3 wherein the temperature compensating spring and the suppression spring have been incorporated in a single spiral. Referring to Fig. 3, the numeral 45 represents the suppression spring and the numeral 46 represents a bimetallic cold junction temperature compensating spring. The springs are joined so that one continuous spiral is formed with the outer end 47 being attached to a manual adjustment 48 which has its axis of rotation in axial alignment with the rotating axis of the coil 32 of galvanometer 30. It will be obvious that other types of suppression and cold junction compensating springs may be incorporated in the apparatus without departing from the concept presented herein.

Figure 4:
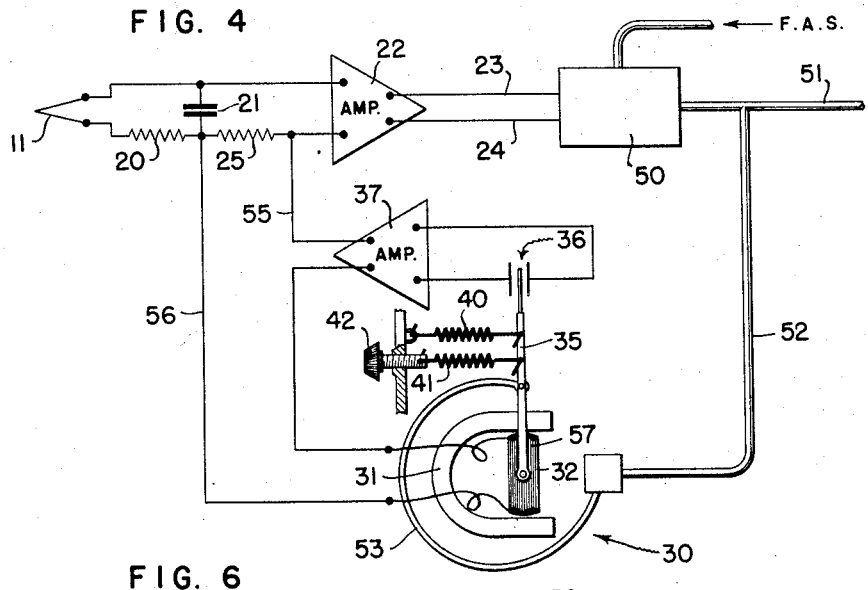
Fig. 4 shows one form that the apparatus may assume in transducing an electric voltage into a pneumatic pressure.

Fig. 4 is a modified version of the apparatus wherein a pneumatic pressure is produced in the output and a pneumatic pressure also forms part of the feedback portion of the apparatus.

In the apparatus of Fig. 4, the components which correspond to those of Fig. 2 carry corresponding reference numerals. Basically, what has been added to Fig. 4 is an electric to pneumatic transducer and a pressure feedback acting upon the galvanometer 30. Specifically, an electro-pneumatic transducer 50 has current supplied thereto by the output leads 23 and 24 of the amplifier 22 and the transducer 50 will produce an output pressure which is proportional to this input current. This output pressure acts upon a Bourdon tube 53 and this Bourdon tube will attempt to displace the arm 35 carried by the galvanometer coil 32. The displacement of the arm 35 changes the capacity of the condenser 36 with a resultant change in the output current from the amplifier 37. The output current from the amplifier 37 establishes a force balancing current passing through the coil 57 as well as a voltage drop across the resistor 25.

The operation of the apparatus of Fig. 4 will be readily understood upon considering the foregoing and noting that the transducer 50 produces a pneumatic pressure on the output thereof proportional to the electric current on the leads 23 and 24. This pneumatic pressure may act through a suitable conduit 51 to control a pressure utilization device and through a conduit 52 to determine the tendency for the Bourdon tube 53 to deflect which is balanced as explained below. The deflecting motion of the Bourdon tube 53 is transferred to the arm 35 which will displace the movable electrode of condenser 36. The resultant unbalance of the condenser 36 will cause the amplifier 37 to produce an output current proportional to this unbalance and the output current will pass through the coil 57 and create a force acting upon the arm 35 tending to move it back to its initial position to counterbalance the force resulting from the Bourdon tube 53. The output current from the amplifier 37 is further applied through the resistor 25 to establish a voltage drop thereacross which is proportional to the output pressure and which supplies a counterbalancing voltage for the voltage originating from the thermocouple 11.

By arranging the apparatus so that the pressure output acts in the feedback circuit, it is possible to linearize the pneumatic pressure output with respect to the thermocouple voltage input. It will further be noted that there is completely isolation of the pressure signal from the thermocouple voltage with the low end of the pressure signal not affecting in any way the input of the amplifier 22. As with the apparatus of Fig. 2, the cold junction compensation and the suppression compensation may be accomplished in this feedback loop so as to not interfere with the sensitivity and reliability of the apparatus.

Figure 5:
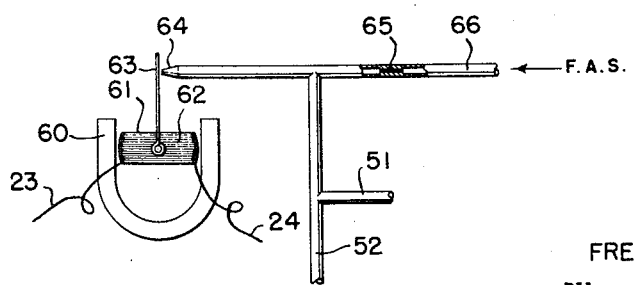
Fig. 5 shows an apparatus for converting an electric current into a pneumatic pressure.

The apparatus shown in Fig. 5 illustrates one form of an electric to pressure transducer which may be used in the box 50 of Fig. 4. This apparatus comprises a permanent magnet 60 which establishes a magnetic field in which a galvanometer coil 61, carrying a coil 62, is arranged to move. The coil support 61 carries a flapper 63 which cooperates with the nozzle 64. The nozzle 64 is supplied by air under pressure through a conduit 66. This air passes through a restriction 65 to the nozzle 64. The air issues from the nozzle in jet form and establishes an impact force against the flapper 63. This impact force is balanced by the current flowing through the leads 23 and 24 and the coil 62 which applies a force tending to move the flapper 63 against the nozzle 64. The movement of the flapper 63 toward the nozzle 64 will result in a balancing force emitting from the nozzle 64 which nozzle force will depend upon the nozzle back pressure. This back pressure will be the output pressure of the transducer and will be applied through a conduit 51 to a suitable utilization apparatus, such as the valve 18 of Fig. 1, as well as to feedback conduit 52. A more complete disclosure with respect to the apparatus of Fig. 5 will be found in my copending application entitled Pneumatic Transducers, filed on even date herewith, and bearing Serial No. 358,224.

Figure 6:
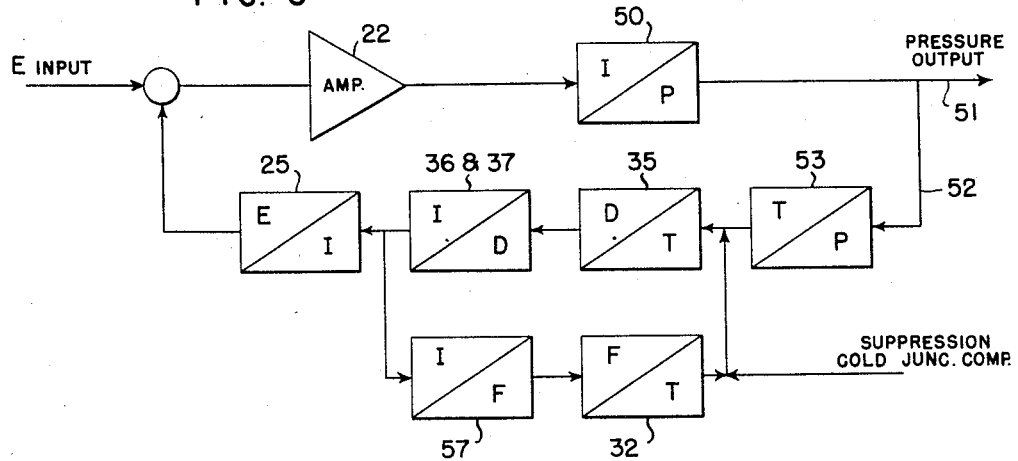
Fig. 6 shows a servo diagram showing how the components of the apparatus are arranged.

Fig. 6 is a servo representation of the apparatus of Fig. 4 which may serve to illustrate the manner in which the apparatus operates. This better shows the fact that there is a first feedback loop in the apparatus, which has a second feedback loop superimposed thereon, with the second feedback loop providing a convenient arrangement for inserting the suppression and cold junction compensation. This figure shows that there is an input voltage applied into the input of amplifier 22, which amplifier in turn produces an output current applied to the transducer 50. Transducer 50 produces a pressure and this pressure is the output pressure of the apparatus as well as the feedback pressure to the line 52. This pressure acts upon a pressure to torque converter which, in Fig. 4, is the Bourdon tube 53. The torque output of the converter 53 is then transformed into a deflection on the arm 35 and the deflection in turn is converted into a current by the motion detector 36 and amplifier 37. The current is then transformed into a voltage by the current flowing through the resistor 25 which comprises a feedback voltage balancing the input voltage. The current output is also shown acting in a current to force transducer which takes the form of the coil 57 and this force is in turn converted into a torque by the coil 32 which acts on the input of the arm 35. This last input serves as a convenient location for inserting the suppression and cold junction compensation without interfering with the principal feedback loop of the apparatus.

Figure 7:
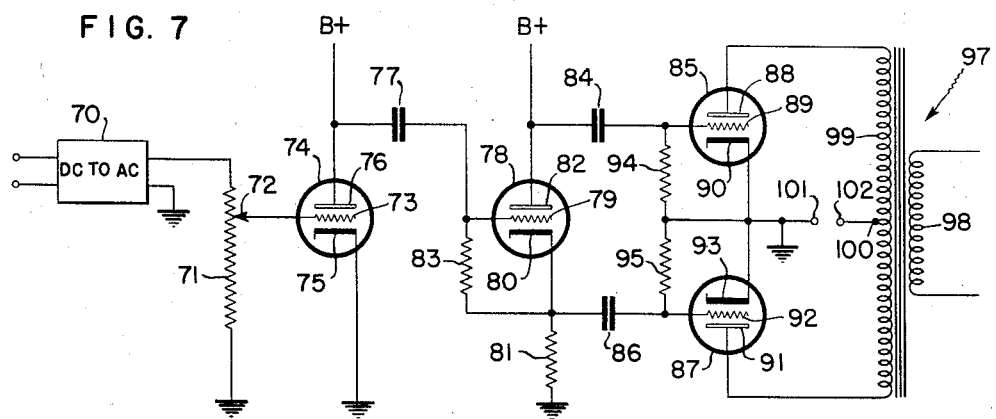
Fig. 7 shows one form that the amplifier of the apparatus may assume.

Fig. 7 shows one way in which the amplifier 22 of Figs. 2 and 4 may be constructed although this construction is not critical and is not considered as limiting the present invention. The apparatus includes a signal converter 70 which may take the form of a vibrating chopper to convert the direct current signal on the input thereof into alternating current whose phase is dependent upon the polarity of the direct current signal on the input thereof. The output of the converter 70 is applied across a slidewire 71 having an adjustable slider 72 associated therewith. Slider 72 has a control electrode 73, of an electronic device 74, connected directly thereto so that the current flow in the device 74 will be determined by the potential existent upon the slider 72. The amplifying device 74 comprises, in addition to the control electrode 73, a cathode 75 and an anode 76. The output of the device 74 is arranged to pass through a condenser 77 to the input of a further amplifying device 78. This amplifying device has a control electrode 79, a cathode 80, and an anode 82. The cathode 80 is grounded through a cathode resistor 81 and there is additionally provided a grid input resistor 83 connected between the control electrode 79 and the cathode 80. The output of the apparatus is taken from anode 82 and is applied through a condenser 84 to the control electrode 89 of device 85. The device 85 additionally includes an anode 88, and a cathode 90. An output is also taken from the device 78 across the cathode resistor 81 to a condenser 86 and is then supplied to a control electrode 92 of a further amplifying device 87. This amplifying device 87 also includes an anode 91 and a cathode 93. A pair of resistors 94 and 95 act as the input resistors for the devices 85 and 87 respectively.

Power is supplied to the amplifying devices 85 and 87 by a power transformer 97 which has a primary winding 98 and a secondary winding 99 which is tapped at 100. The output of the two amplifiers is taken on a pair of terminals 101 and 102.

The operation of the amplifier of Fig. 7 is conventional in that the direct current signal applied to the input of the converter 70 is converted into an alternating current and this alternating current is amplified by the amplifying devices 74 and 78 and thence applied to the discriminating stages 85 and 87 with the resultant output, appearing upon the output terminals 101 and 102, being a series of direct current pulses which may be suitably filtered and applied to the output connecting leads 23 and 24, shown in Figs. 2 and 4.

Figure 8:
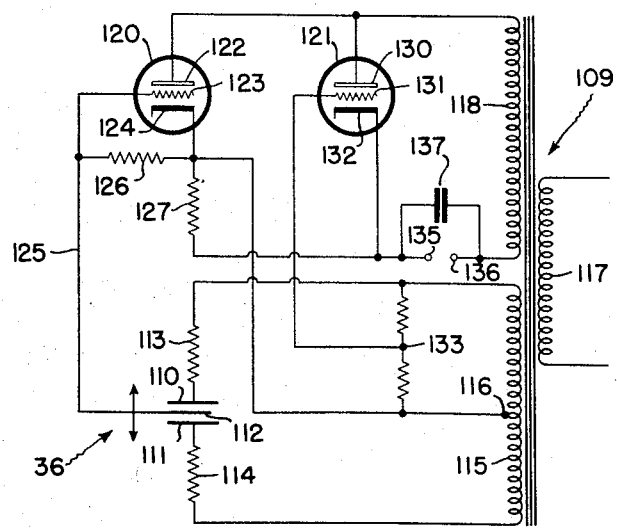
Fig. 8 shows a form of electric motion detector which may be used in the apparatus.

The apparatus of Fig. 8 shows one form that the motion detector used in the feedback loop may assume. This portion of the apparatus includes the motion detector condenser 36 as well as an amplifier section which will produce an output current proportional to the motion of the condenser element. The motion detecting condenser 36 is shown to comprise a pair of fixed condenser plates 110 and 111 and a movable condenser 112 disposed between the two fixed plates. A transformer 109 supplies energy to a bridge which includes the motion detecting condenser 36. This transformer comprises a primary winding 117 and a pair of secondary windings 115 and 118 with the secondary winding 115 tapped at 116. The bridge circuit additionally includes a pair of resistors 113 and 114.

The displacement of the movable plate 112 will establish a potential on the plate 112 indicating an unbalance condition and this unbalance signal will be passed through a conductor 125 to an amplifier device 120. The device 120 comprises an anode 122, a control electrode 123, and a cathode 124 and has on the input thereof a grid resistor 126 and a cathode resistor 127 connected in the cathode circuit thereof. The apparatus additionally includes a further electronic device 121 having an anode 130, a control electrode 131, and a cathode 132. The control electrode 131 of the device 121 is connected to a voltage divider 133 connected across the upper half of the secondary winding 115. The output of the apparatus is on terminals 135 and 136 which terminals are bypassed by a condenser 137.

In considering the operation of the apparatus of Fig. 8, let it first be assumed that the movable electrode 112 is centered between the fixed plates 110 and 111 so that there is no resultant output electrical signal appearing on the output lead 125. With no input signal applied to the device 120, the control electrode 123 will be effectively connected to the cathode 124 and the device 120 will act as a diode and will be conducting during the half cycle on which the upper end of the secondary winding 118 is positive with respect to the lower end. This will mean a pulsating direct current will flow through the terminals 135 and 136. Further, the device 121 will have a predetermined current flow therethrough which will be established by the voltage derived from the voltage divider 133 on the upper half of the secondary winding 115 as well as the voltage derived from the cathode 127 in the output of the device 120. As the device 121 will also be conducting during the same half cycle, this conduction will tend to reinforce the conduction to the device 120. There will thus be flowing through the output terminals 135 and 136 a series of direct current pulses whose average amplitude is indicative of a balance condition under the conditions assumed above.

If the movable plate 112 should be displaced in an upward direction toward the plate 110 and under the assumption that the winding 115 is phased the same as the winding 118, a positively phased signal will be applied through the lead 125 to the input of the device 120. This positively phased signal will cause the device 120 to conduct more and the increased conduction of this device will produce a biasing action in the input of the device 121 which will likewise cause this device to conduct more. The net result is an increased current flow through the output terminals 135 and 136.

If the movable plate 112 is moved in a downward direction, the phasing of the signal on the output lead 125 will be reversed and this reversal will tend to decrease the current flow through the device 120 with a resultant decrease in the current flow through the device 121. The final result is a decreased output from the terminals 135 and 136. It will thus be seen that the current flow in the output of this apparatus will follow the movement of the movable condenser plate 112. While a specific arrangement has been shown for the motion detector, it will be obvious that there are many suitable configurations which will accomplish the same end result of producing an output current which is proportional to the input motion applied to the condenser plate 112. As will be obvious to those skilled in the art, if necessity demands, the circuit of Fig. 8 may be modified to produce currents of reversible polarity in accordance with the movement of the condenser plate.

While, in accordance with the provisions of the statutes, there has been illustrated and described the best forms of the invention known, it will be apparent to those skilled in the art that changes may be made in the forms of the apparatus disclosed without departing from the spirit of the invention as set forth in the appended claims and that in some cases certain features of the invention may be used to advantage without a corresponding use of other features.

What I claim as new and desire to secure by Letters Patent is:

1. An apparatus for changing one form of energy into another, the combination comprising, an input circuit for said apparatus, transducing means for changing the input energy to a second energy, feedback means from said transducing means output to said input circuit, said feedback means comprising a second transducing means of the electro-mechanical displacement type for changing the second energy to said input energy, and a second feedback connected to said second transducing means to mechanically force balance said second transducing means.

2. An apparatus for changing one form of energy into another, the combination comprising, an input circuit for said apparatus, transducing means for changing the input energy to a second energy, feedback means from said transducing means output to said input circuit, said feedback means comprising a second electro-mechanical displacement type transducing means for changing the second energy to said input energy, a second feedback connected to said second transducing means to force balance said second transducing means, and a resilient mechanical force producing member connected to act in parallel with the force balancing action of said second feedback.

3. An apparatus for changing one form of energy into another, the combination comprising, an input circuit for said apparatus, transducing means for changing the input energy to a second energy, feedback means from said transducing means output to said input circuit, said feedback means comprising a second electro-mechanical displacement type transducing means for changing the second energy to said input energy, a second feedback connected to said second transducing means to force balance said second transducing means, and a resilient mechanical force producing member acting in parallel with said second feedback and comprising a bimetal temperature compensating element.

4. An apparatus for changing one form of energy into another, the combination comprising, an input circuit for said apparatus, transducing means for changing the input energy to a second energy, feedback means from said transducing means output to said input circuit, said feedback means comprising a second electro-mechanical displacement type transducing means for changing the second energy to said input energy, a second feedback connected to said second transducing means to force balance said second transducing means, and a further force producing member comprising a manually adjusted suppression spring acting in parallel with the force balancing action of said second feedback.

5. An apparatus for changing one form of energy into another, the combination comprising, an input circuit for said apparatus, transducing means for changing the input energy to a second energy, feedback means from said transducing means output to said input circuit, said feedback means comprising a second electro-mechanical displacement type transducing means for changing the second energy to said input energy, a second feedback connected to said second transducing means to force balance said second transducing means, and a pair of resilient force producing members connected to act in parallel with the force balancing action of said second feedback, one of said pair being a manually adjusted suppression spring and the other being a temperature compensating spring.

6. A voltage to current transducer, comprising, an amplifier having a voltage signal input and a current output, said current output being arranged for connection to a utilization circuit, and a feedback circuit around said amplifier comprising, a galvanometer having a coil energized by the output current of said amplifier, means sensing the movement of said galvanometer coil and producing a second current proportional to the input current of said coil, circuit means connecting the second current to the input of said amplifier to produce an electrical voltage signal in opposition to the voltage signal on said amplifier input, and a second coil on said galvanometer arranged to have said second current flow therethrough and produce a force balancing action in opposition to the amplifier output current flowing in said first coil.

7. An apparatus for changing one form of energy into another, the combination comprising, an input circuit for said apparatus, transducing means changing the input energy into a second energy, feedback means from said transducing means output to said input circuit, said feedback means comprising a second electro-mechanical transducing means for changing the second energy to said input energy, and a resilient force producing member acting in said feedback circuit to provide a variation in the second energy with respect to said input energy.

8. An apparatus for changing one form of energy into a second form, the combination comprising, an input circuit for said apparatus, means transducing the input energy into a second energy connected to said input circuit, feedback means from the output of said transducing means to said input circuit, said feedback means comprising a second transducing means arranged to convert said second energy to said input energy, and a pair of resilient force producing members connected to act in parallel on said second transducing means, one of said pair being manually adjustable to vary the suppression of said apparatus and the other being a temperature compensating spring.

9. Electrical measuring apparatus, comprising, amplifying apparatus for converting an electrical voltage signal on the input thereof into an output control signal, said control signal being of a magnitude proportional to the voltage signal, and a feedback circuit connected around said amplifying apparatus to apply the control signal in converted form to said input and comprising a resilient member opposing the effect of the control signal in said feedback.

10. Electrical measuring apparatus, comprising, amplifying apparatus for converting an electrical voltage signal on the input thereof into an output control signal, said control signal being of a magnitude proportional to the voltage signal, a feedback circuit connected around said amplifying apparatus to apply to control signal in converted form to said input, said circuit comprising resilient means and an electro-mechanical force producing device having a force proportional to the feedback signal opposing a force produced by said output control signal.

11. Apparatus as set forth in claim 10 wherein said resilient means includes a temperature compensating element.

12. Electrical measuring apparatus comprising, a thermoelectric source of potential, amplifying apparatus having said source connected to the input thereof, said apparatus converting the input signal from said source to a proportional output control signal, force producing means connected to respond to said output control signal and producing a mechanical force proportional to said output signal, and adjustable means producing an adjustable force to oppose the force produced by said force producing means.

13. Apparatus as set forth in claim 12 wherein said adjustable means includes a resilient temperature compensating element.

References Cited in the file of this patent

UNITED STATES PATENTS

| | | |
|---|---|---|
| 1,138,632 | Creveling | May 11, 1915 |
| 1,639,365 | Brown | Aug. 16, 1927 |
| 2,027,054 | Miessner | Jan. 7, 1936 |
| 2,074,145 | Emmerling | Mar. 16, 1937 |
| 2,310,298 | Kuhl et al. | Feb. 9, 1943 |
| 2,501,583 | Schafer | Mar. 21, 1950 |
| 2,525,967 | Smoot | Oct. 17, 1950 |
| 2,538,618 | Fairchild | Jan. 16, 1951 |
| 2,559,662 | Rheingold et al. | July 10, 1951 |
| 2,751,746 | Mouzon | Oct. 16, 1951 |
| 2,619,552 | Kerns | Nov. 25, 1952 |
| 2,625,911 | Schmitt | Jan. 20, 1953 |
| 2,662,540 | Rutherford et al. | Dec. 15, 1953 |
| 2,686,287 | Gerg | Aug. 10, 1954 |

FOREIGN PATENTS

| | | |
|---|---|---|
| 484,332 | Great Britain | May 3, 1938 |